United States Patent
Flores et al.

(10) Patent No.: US 12,378,357 B2
(45) Date of Patent: Aug. 5, 2025

(54) POLYAMIDES AND CORRESPONDING POLYMER COMPOSITIONS AND ARTICLES

(71) Applicant: SOLVAY SPECIALTY POLYMERS USA, LLC, Alpharetta, GA (US)

(72) Inventors: Joel Flores, Alpharetta, GA (US); Stéphane Jeol, Saint-Genis-Laval (FR)

(73) Assignee: SOLVAY SPECIALTY POLYMERS USA, LLC, Alpharetta, GA (US)

(*) Notice: Subject to any disclaimer, the term of this patent is extended or adjusted under 35 U.S.C. 154(b) by 839 days.

(21) Appl. No.: 17/609,017

(22) PCT Filed: May 7, 2020

(86) PCT No.: PCT/EP2020/062781
§ 371 (c)(1),
(2) Date: Nov. 5, 2021

(87) PCT Pub. No.: WO2020/229318
PCT Pub. Date: Nov. 19, 2020

(65) Prior Publication Data
US 2022/0220255 A1    Jul. 14, 2022

Related U.S. Application Data

(60) Provisional application No. 62/847,409, filed on May 14, 2019.

(30) Foreign Application Priority Data

Sep. 23, 2019  (EP) .................................... 19198924

(51) Int. Cl.
*C08K 7/14* (2006.01)
*C08G 69/26* (2006.01)

(52) U.S. Cl.
CPC .............. *C08G 69/265* (2013.01); *C08K 7/14* (2013.01)

(58) Field of Classification Search
CPC .......... C08G 69/265; C08K 7/14; C08K 7/06; C08K 3/04; C08L 77/06
See application file for complete search history.

(56) References Cited

U.S. PATENT DOCUMENTS

| | | | |
|---|---|---|---|
| 3,875,120 A | 4/1975 | Brinkmann et al. | |
| 3,875,129 A | 4/1975 | Herwig et al. | |
| 4,246,395 A | 1/1981 | Mortimer | |
| 2013/0165621 A1 | 6/2013 | Kanda et al. | |
| 2016/0152770 A1 | 6/2016 | Richter et al. | |
| 2017/0107326 A1 | 4/2017 | Bayer et al. | |
| 2019/0263965 A1 | 8/2019 | Wolffs et al. | |
| 2020/0017636 A1 | 1/2020 | Capelot et al. | |
| 2020/0024395 A1* | 1/2020 | Capelot | C08G 69/265 |
| 2020/0216627 A1 | 7/2020 | Hochstetter et al. | |

FOREIGN PATENT DOCUMENTS

| | | |
|---|---|---|
| EP | 0325030 A2 | 7/1989 |
| EP | 3358411 A1 | 8/2018 |
| EP | 3378883 A1 | 9/2018 |
| JP | 63154739 A | 6/1988 |
| JP | 07165911 A | 6/1995 |
| JP | 2004-277445 A | 10/2004 |
| JP | 2010285553 A | 12/2010 |
| WO | 18172718 A1 | 9/2018 |
| WO | 2018172717 A1 | 9/2018 |
| WO | 18229114 A1 | 12/2018 |
| WO | 18234441 A1 | 12/2018 |
| WO | 2019147457 A2 | 8/2019 |

OTHER PUBLICATIONS

Murphy J., in "Additives for Plastics Handbook", 2nd Edition, 2001, Chapter 5.2.3., p. 43-48—Elsevier Advanced Technology.
Standard ASTM D3418-03, "Standard Test Method for Transition Temperatures and Enthalpies of Fusion and Crystallization of Polymers by Differential Scanning Calorimetry", 2003, p. 1-7.

* cited by examiner

*Primary Examiner* — Jiangtian Xu
(74) *Attorney, Agent, or Firm* — Osha Bergman Watanabe & Burton LLP

(57) ABSTRACT

Described herein are polyamides (PA) derived from the polycondensation of monomers in a reaction mixture comprising: (1) a diamine component (A) comprising 20 mol % to 95 mol % of a $C_4$ to $C_{12}$ aliphatic diamine, and 5 mol % to 80 mol % of a bis(aminoalkyl)cyclohexane, where mol % is relative to the total number of moles of all diamine monomers in the diamine component; and a dicarboxylic acid component (B) comprising: 30 mol % to 99 mol % of terephthalic acid and 1 mol % to 70 mol % of a cyclohexane dicarboxylic acid, wherein mol % is relative to the total number of moles of all dicarboxylic acid monomers in the dicarboxylic acid component. It was surprisingly discovered that, with the particular combination of the bis(aminoalkyl) cyclohexane and the cyclohexanedicarboxylic acid, the polyamides (PA) had, on the whole, improved thermal performance relative to analogous polyamides, in which the cyclohexanedicarboxylic acid is replaced with an aromatic dicarboxylic acid.

9 Claims, No Drawings

POLYAMIDES AND CORRESPONDING POLYMER COMPOSITIONS AND ARTICLES

CROSS REFERENCE TO RELATED APPLICATIONS

This application is a U.S. National Stage entry under 35 U.S.C. § 371 of International Application No. PCT/EP2020/062781, filed on May 7, 2020, which claims priority to U.S. provisional application No. 62/847,409, filed on May 14, 2019, and European patent application No. 19198924.3, filed on Sep. 23, 2019, the entire contents of each being incorporated herein by reference for all purposes.

FIELD

The invention relates to polyamides having high thermal performance. The invention further relates to polymer compositions including the polyamides and to articles including the polyamides or polymer compositions.

BACKGROUND

Thermal performance (glass transition temperature ("Tg"), melt temperature ("Tm"), and crystallinity ("$\Delta H_f$")) are significant factors in determining the application settings in which polyamides can be desirably used. Semi-aromatic polyamides are of significant interest because of their relatively high melt temperatures ("Tm") and crystallinity ("$\Delta H_f$"). Traditional polyamides generally have a Tg of less than 150° C., which is adequate for traditional application settings. However, new applications and markets subject the polyamides to even more challenging thermal conditions and require a Tg of 150° C. and above. The introduction of cycloaliphatic recurring units into semi-aromatic polyamides has been successful in increasing the Tg of the resulting polyamide, however, at the expense of either undesirably lowering the Tm and $\Delta H_f$, or, in some cases, increasing the Tm of the polyamide to 370° C. In the former case, the polyamide is limited to lower temperature applications and has properties approaching those of amorphous polyamides. In the latter case, the polyamide is not suitably melt processed, due at least in part to decomposition of the polymer at melt processing temperatures and residence times. Accordingly, there is a need develop polyamides that have a Tg and Tm high enough to be used in a broad array of application settings, a Tm low enough to be desirably melt processed, and a $\Delta H_f$ desirably high enough to reduce injection molding cycle time and to improve high temperature mechanical properties, chemical resistance, heat deflection temperature and the like.

SUMMARY

In a first aspect, the invention relates to a polyamide (PA) derived from the polycondensation of monomers in a reaction mixture comprising (1) a diamine component (A) comprising 20 mol % to 95 mol % of a $C_4$ to $C_{12}$ aliphatic diamine and 5 mol % to 80 mol % of bis(aminoalkyl) cyclohexane, wherein mol % is relative to the total number of moles of all diamines in the diamine component; and (2) a dicarboxylic acid component (B) comprising: 30 mol % to 99 mol % of terephthalic acid and 1 mol % to 70 mol % of cyclohexanedicarboxylic acid, wherein mol % is relative to the total number of moles of all dicarboxylic acids in the dicarboxylic acid component.

In some embodiments, the polyamide (PA) comprises a heat of fusion ("$\Delta H_f$") of at least 30 J/g, as measured according to ASTM D3418 using a heating rate of 20° C./minute. In some embodiments, the polyamide (PA) comprises a glass transition temperature ("Tg") of at least 145° C., as measured according to ASTM D3418. In some embodiments, the polyamide (PA) comprises a melting temperature ("Tm") of at least 295° C., as measured according to ASTM D3418.

In a second aspect, the invention relates to a method for making the polyamide (PA), the method comprising reacting, in the reaction mixture, at least the $C_4$ to $C_{12}$ aliphatic diamine, the bis(aminoalkyl)cyclohexane, the terephthalic acid, and the cyclohexanedicarboxylic acid to form the polyamide (PA).

In a third aspect, the invention relates to a polymer composition (C), comprising the polyamide (PA) and at least one component selected from the group consisting of reinforcing agents, tougheners, plasticizers, colorants, pigments, antistatic agents, dyes, lubricants, thermal stabilizers, light stabilizers, flame retardants, nucleating agents and antioxidants.

In a fourth aspect, the invention relates to an article comprising the polymer composition (C), wherein the article is a mobile electronic device article or component, an electric component, an electronic component, an automotive component, a food contact component, a plumbing component, and oil and gas component, a continuous fiber reinforced thermoplastic composite material or a 3D printed article.

DETAILED DESCRIPTION

Described herein are polyamides (PA) derived from the polycondensation of monomers in a reaction mixture comprising: (1) a diamine component (A) comprising 20 mol % to 95 mol % of a $C_4$ to $C_{12}$ aliphatic diamine, and 5 mol % to 80 mol % of a bis(aminoalkyl)cyclohexane, where mol % is relative to the total number of moles of all diamine monomers in the diamine component; and a dicarboxylic acid component (B) comprising: 30 mol % to 99 mol % of terephthalic acid and 1 mol % to 70 mol % of a cyclohexane dicarboxylic acid, wherein mol % is relative to the total number of moles of all dicarboxylic acid monomers in the dicarboxylic acid component. It was surprisingly discovered that, with the particular combination of the bis(aminoalkyl) cyclohexane and the cyclohexanedicarboxylic acid, the polyamides (PA) had, on the whole, improved thermal performance relative to analogous polyamides, in which the cyclohexanedicarboxylic acid is replaced with an aromatic dicarboxylic acid. The polyamides described herein have a glass transition temperature ("Tg") of at least 145° C., melting temperature ("Tm") of at least 295° C., and a heat of fusion ("$\Delta H_f$") of at least 30 J/g.

In the present application, any description, even though described in relation to a specific embodiment, is applicable to and interchangeable with other embodiments of the present disclosure. Where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components; any element or component recited in a list of elements or components may be omitted from such list; and any recitation herein of numerical ranges by endpoints includes all numbers subsumed within the recited ranges as well as the endpoints of the range and equivalents.

Unless specifically limited otherwise, the term "alkyl", as well as derivative terms such as "alkoxy", "acyl" and "alkylthio", as used herein, include within their scope straight chain, branched chain and cyclic moieties. Examples of alkyl groups are methyl, ethyl, 1-methylethyl, propyl, 1,1-dimethylethyl, and cyclo-propyl. Unless specifically stated otherwise, each alkyl and aryl group may be unsubstituted or substituted with one or more substituents selected from but not limited to halogen, hydroxy, sulfo, $C_1$-$C_6$ alkoxy, $C_1$-$C_6$ alkylthio, $C_1$-$C_6$ acyl, formyl, cyano, $C_6$-$C_{15}$ aryloxy or $C_6$-$C_{15}$ aryl, provided that the substituents are sterically compatible and the rules of chemical bonding and strain energy are satisfied. The term "halogen" or "halo" includes fluorine, chlorine, bromine and iodine, with fluorine being preferred.

The term "aryl" refers to a phenyl, indanyl or naphthyl group. The aryl group may comprise one or more alkyl groups, and are called sometimes in this case "alkylaryl"; for example may be composed of a cycloaromatic group and two $C_1$-$C_6$ groups (e.g. methyl or ethyl). The aryl group may also comprise one or more heteroatoms, e.g. N, O or S, and are called sometimes in this case "heteroaryl" group; these heteroaromatic rings may be fused to other aromatic systems. Such heteroaromatic rings include, but are not limited to furanyl, thienyl, pyrrolyl, pyrazolyl, imidazolyl, triazolyl, isoxazolyl, oxazolyl, thiazolyl, isothiazolyl, pyridyl, pyridazyl, pyrimidyl, pyrazinyl and triazinyl ring structures. The aryl or heteroaryl substituents may be unsubstituted or substituted with one or more substituents selected from but not limited to halogen, hydroxy, $C_1$-$C_6$ alkoxy, sulfo, $C_1$-$C_6$ alkylthio, $C_1$-$C_6$ acyl, formyl, cyano, $C_6$-$C_{15}$ aryloxy or $C_6$-$C_{15}$ aryl, provided that the substituents are sterically compatible and the rules of chemical bonding and strain energy are satisfied.

The Diamine Component (A)

The diamine component (A) component includes all diamines in the reaction mixture, including 20 mol % to 95 mol % $C_4$ to $C_{12}$ aliphatic diamine and 5 mol % to 80 mol % of a bis(aminoalkyl)cyclohexane. When referring to the concentration of monomers in the diamine component (A), it will be understood that the concentration is relative to the total number of moles of all diamines in the diamine component (A), unless explicitly noted otherwise.

In some embodiments, the $C_4$ to $C_{12}$ aliphatic diamine is represented by the following formula:

$$H_2N-R_1-NH_2, \quad (1)$$

where $R_1$ is a $C_4$ to $C_{12}$ alkyl group, preferably a $C_6$ to $C_{10}$ alkyl group. In some embodiments, $R_1$ is —$(CH_2)_m$—, where m is from 4 to 12, preferably from 5 to 11, most preferably 6.

In some embodiments, the $C_4$ to $C_{12}$ aliphatic diamine is selected from the group consisting of 1,4-diaminobutane (putrescine), 1,5-diaminopentane (cadaverine), 2-methyl-1,5-diaminopentane, hexamethylenediamine (or 1,6-diaminohexane), 3-methylhexamethylenediamine, 2,5-dimethylhexamethylenediamine, 2,2,4-trimethyl-hexamethylenediamine, 2,4,4-trimethyl-hexamethylenediamine, 1,7-diaminoheptane, 1,8-diaminooctane, 2,2,7,7-tetramethyloctamethylenediamine, 1,9-diaminononane, 2-methyl-1,8-diaminooctane, 5-methyl-1,9-diaminononane, 1,10-diaminodecane, 1,11-diaminoundecane, and 1,12-diaminododecane. Preferably, the $C_4$ to $C_{12}$ aliphatic diamine is selected from the group consisting of 1,6-diaminohexane, 3-methylhexamethylenediamine, 2,2,4-trimethyl-hexamethylenediamine, 2,4,4-trimethyl-hexamethylenediamine, 1,9-diaminononane, 2-methyl-1,8-diaminooctane, 5-methyl-1,9-diaminononane, and 1,10-diaminodecane. Preferably, the $C_4$ to $C_{12}$ aliphatic diamine is a $C_6$ to $C_{10}$ aliphatic diamine or a $C_5$ to $C_9$ aliphatic diamine. Most preferably, the $C_4$ to $C_{12}$ aliphatic diamine is 1,6-diaminohexane.

In some embodiments, concentration of the $C_4$ to $C_{12}$ aliphatic diamine is from 25 mol % to 95 mol %, from 30 mol % to 95 mol %, from 35 mol % to 95 mol %, from 40 mol % to 95 mol %, from 45 mol % to 95 mol %, or from 50 mol % to 95 mol %. In some embodiments, concentration of the $C_4$ to $C_{12}$ diamine is from 20 mol % to 90 mol %, from 25 mol % to 90 mol %, from 30 mol % to 90 mol %, from 35 mol % to 90 mol %, from 40 mol % to 90 mol %, from 45 mol % to 90 mol %, or from 50 mol % to 90 mol %.

The bis(aminoalkyl)cyclohexane is represented by the following formula:

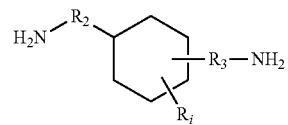

where $R_2$ and $R_3$ are independently selected $C_1$ to $C_{10}$ alkyls; $R_1$, at each location, is selected from the group consisting of an alkyl, an aryl, an alkali or alkaline earth metal sulfonate, an alkyl sulfonate, and a quaternary ammonium; and i is an integer from 0 to 10. The aminoalkyl groups are relatively positioned in the meta position (1,3-) or the para position (1,4-). Preferably, i is 0 and $R_2$ and $R_3$ are both —$CH_2$—. Most preferably, the bis(aminoalkyl)cyclohexane is selected from 1,3-bis(aminomethyl)cyclohexane ("1,3-BAC") and 1,4-bis(aminomethyl)cyclohexane ("1,4-BAC"). Of course, the bis(aminoalkyl)cyclohexane can be in a cis or trans conformation. Accordingly, the diamine component (A) can include only the cis-bis(aminoalkyl)cyclohexane, only trans-bis(aminoalkyl)cyclohexane or a mixture of cis- and trans-bis(aminoalkyl)cyclohexane.

In some embodiments, the concentration of the bis(aminoalkyl)cyclohexane is from 5 mol % to 75 mol %, from 5 mol % to 70 mol %, from 5 mol % to 65 mol %, from 5 mol % to 60 mol %, from 5 mol % to 55 mol %, or from 5 mol % to 50 mol %. In some embodiments, the concentration of the bis(aminoalkyl)cyclohexane is from 10 mol % to 75 mol %, from 10 mol % to 70 mol %, from 10 mol % to 65 mol %, from 10 mol % to 60 mol %, from 10 mol % to 55 mol %, or from 10 mol % to 50 mol %.

As noted above, in some embodiments, the diamine component (A) includes one or more additional diamines. The additional diamines are distinct from the $C_4$ to $C_{12}$ aliphatic diamine and distinct from the bis(aminoalkyl)cyclohexane. In some embodiments, one, some, or all of the additional diamines are represented by Formula (1), each distinct from each other and distinct from the $C_4$ to $C_{12}$ aliphatic diamine. In some embodiments, the each additional diamine is selected from the group consisting of 1,2 diaminoethane, 1,2-diaminopropane, propylene-1,3-diamine, 1,3 diaminobutane, 1,4-diaminobutane, 1,5-diaminopentane, 2-methyl-1,5-diaminopentane, 1,6-diaminohexane, 3-methylhexamethylenediamine, 2,5 dimethylhexamethylenediamine, 2,2,4-trimethyl-hexamethylenediamine, 2,4,4-trimethyl-hexamethylenediamine, 1,7-diaminoheptane, 1,8-diaminooctane, 2,2,7,7 tetramethyloctamethylenediamine, 1,9-diaminononane, 2-methyl-1,8-diaminooctane, 5-methyl-1,9-diaminononane, 1,10-diaminodecane, 1,11-diaminoundecane, 1,12-diaminododecane, 1,13-diaminotridecane, 2,5-bis(aminomethyl)tetrahydrofuran and N,N-Bis(3-aminopropyl)methylamine. Included in this category are also cycloaliphatic diamines such as isophorone diamine, 1,3-diaminocyclohexane, 1,4-diaminocyclohexane, bis-p-aminocyclohexylmethane. In some embodiments, the diamine component is free of cycloaliphatic diamines other than the bis(aminoalkyl)cyclohexane. As used herein, free of a monomer (e.g. bis(aminoalkyl)cyclohexane) means that the concentration of the monomer in the corresponding component (e.g. the diamine component (A)) is less than 1 mol %, preferably less than 0.5 mol. %, more preferably less than 0.1 mol %, even more preferably less than 0.05 mol %, most preferably less than 0.01 mol %.

The Dicarboxylic Acid Component (B)

The dicarboxylic acid component (B) includes all dicarboxylic acids in the reaction mixture, including 30 mol % to 99 mol % of terephthalic acid and 1 mol % to 70 mol % of a cyclohexanedicarboxylic acid. When referring to the concentration of monomers in the dicarboxylic acid component (B), it will be understood that the concentration is relative to number of moles of all dicarboxylic acids in the dicarboxylic acid component (A), unless explicitly noted otherwise.

In some embodiments, the concentration of the terephthalic acid is from 30 mol % to 99 mol %, from 40 mol % to 99 mol %, from 45 mol % to 99 mol %, from 50 mol % to 99 mol %. In some embodiments, the concentration of the terephthalic acid is from 35 mol % to 97 mol %, from 40 mol % to 97 mol %, from 45 mol % to 97 mol %, from 50 mol % to 97 mol %.

The cyclohexanedicarboxylic acid is represented by the following formula:

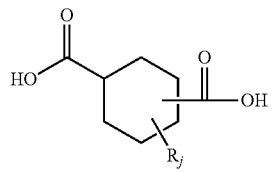

where $R_j$ is selected from the group consisting of an alkyl, an aryl, an alkali or alkaline earth metal sulfonate, an alkyl sulfonate, and a quaternary ammonium; and j is an integer from 0 to 10. The explicit —COOH groups are relatively positioned in the meta position (1,3-) or the para position (1,4-), preferably the para position. Preferably, the cyclohexanedicarboxylic acid is 1,4-cyclohexanedicarboxylic acid ("CHDA") (j is 0). Of course, the cyclohexanedicarboxylic acid can be in a cis or trans conformation. Accordingly, the dicarboxylic acid component (B) can include only the cis-cyclohexanedicarboxylic acid, only trans-cyclohexanedicarboxylic acid or a mixture of cis- and trans-cyclohexanedicarboxylic acid.

The concentration of the cyclohexanedicarboxylic acid is from 1 mol % to 70 mol %. In some embodiments, the concentration of the cyclohexanedicarboxylic acid is from 1 mol % to 65 mol %, from 1 mol %, to 60 mol %, from 1 mol % to 55 mol %, or from 1 mol % to 50 mol %.

As noted above, in some embodiments, the dicarboxylic acid component (B) includes one or more additional dicarboxylic acids. Each additional dicarboxylic acid is distinct from each other and distinct from the terephthalic acid and the cyclohexanedicarboxylic acid. In some embodiments, one, some, or all of the additional dicarboxylic acids are represented by Formula (3), each distinct from each other and distinct from the cyclohexanedicarboxylic acid.

In some embodiments, the one or more additional dicarboxylic acids are independently selected from the group consisting of $C_4$ to $C_{12}$ aliphatic dicarboxylic acids, aromatic dicarboxylic acids, and cycloaliphatic dicarboxylic acids. Examples of desirable $C_4$ to $C_{10}$ aliphatic dicarboxylic acids include, but are not limited to, succinic acid [HOOC—$(CH_2)_2$—COOH], glutaric acid [HOOC—$(CH_2)_3$—COOH], 2,2-dimethyl-glutaric acid [HOOC—$C(CH_3)_2$—$(CH_2)_2$—COOH], adipic acid [HOOC—$(CH_2)_4$—COOH], 2,4,4-trimethyl-adipic acid [HOOC—$CH(CH_3)$—$CH_2$—$C(CH_3)_2$—$CH_2$—COOH], pimelic acid [HOOC—$(CH_2)_5$—COOH], suberic acid [HOOC—$(CH_2)_6$—COOH], azelaic acid [HOOC—$(CH_2)_7$—COOH], sebacic acid [HOOC—$(CH_2)_8$—COOH], 1,12-dodecanedioic acid [HOOC—$(CH_2)_{10}$—COOH].

Examples of desirable aromatic dicarboxylic acids include, but are not limited to, phthalic acids, including isophthalic acid (IA), naphthalenedicarboxylic acids (e.g. naphthalene-2,6-dicarboxylic acid), 4,4' bibenzoic acid, 2,5-pyridinedicarboxylic acid, 2,4-pyridinedicarboxylic acid, 3,5-pyridinedicarboxylic acid, 2,2-bis(4-carboxyphenyl)propane, 2,2-bis(4-carboxyphenyl)hexafluoropropane, 2,2-bis(4-carboxyphenyl)ketone, 4,4'-bis(4-carboxyphenyl)sulfone, 2,2-bis(3-carboxyphenyl)propane, 2,2-bis(3-carboxyphenyl)hexafluoropropane, 2,2-bis(3-carboxyphenyl)ketone, bis(3-carboxyphenoxy)benzene.

Examples of desirably cycloaliphatic dicarboxylic acids include, but are not limited to, cyclopropane-1,2-dicarboxylic acid, 1-methylcyclopropane-1,2-dicarboxylic acid, cyclobutane-1,2-dicarboxylic acid, tetrahydrofuran-2,5-dicarboxylic acid, 1,3-adamantanedicarboxylic acid.

In some embodiments in which the polyamide (PA) includes one or more additional dicarboxylic acids, the total concentration of the one or more additional dicarboxylic acids is no more than 20 mol %.

The Polyamide (PA)

The polyamide (PA) formed from the polycondensation of the monomers in the diamine component and dicarboxylic acid component, as described above, includes recurring units $R_{PA1}$ to $R_{PA4}$, represented by the following formulae, respectively.

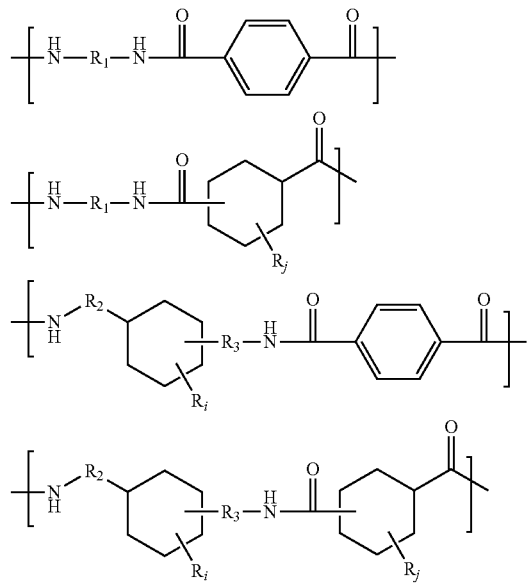

where $R_1$ to $R_3$, $R_i$, $R_j$, i and j are as defined above. The person of ordinary skill in the art will recognize that recurring unit $R_{P41}$ is formed from the polycondensation of the $C_4$ to $C_{12}$ aliphatic diamine with the terephthalic acid, recurring unit $R_{P42}$ is formed from the polycondensation of the $C_4$ to $C_{12}$ aliphatic diamine with the cyclohexanedicarboxylic acid, recurring unit $R_{P43}$ is formed from the polycondensation of the bis(aminoalkyl)cyclohexane with the terephthalic acid, and recurring unit $R_{P44}$ is formed from the polycondensation of the bis(aminoalkyl)cyclohexane with the cyclohexanedicarboxylic acid. Preferably, $R_{P42}$ and $R_{P44}$ are represented by the following formulae, respectively:

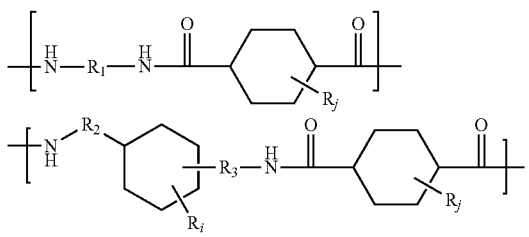

where $R_1$ to $R_3$, $R_i$, $R_j$, i and j are as defined above. In some embodiments, $R_1$ is $-(CH_2)-_m$, where m is from 4 to 12, preferably from 5 to 11, most preferably 6. Additionally or alternatively, in some embodiments $R_2$ and $R_3$ are both $-CH_2-$, and i and j are both zero. Preferably, $R_1$ is $-(CH_2)_6-$, $R_2$ and $R_3$ are both $-CH_2-$, and i and j are both zero, in all of Formulae (4) to (9).

In some embodiments, the total concentration of recurring units $R_{P41}$ to $R_{P44}$ in the polyamide (PA) is at least 50 mol %, at least 60 mol %, at least 70 mol %, at least 80 mol %, at least 90 mol %, at least 95 mol %, at least 97 mol %, at least 98 mol %, at least 99 mol % or at least 99.5 mol %. When referring to mol % of a recurring unit, it will be understood that the concentration is relative to the total number of recurring units in the indicated polymer, unless explicitly noted otherwise.

The polyamides (PA) are semi-crystalline polyamides. As used herein, a semi-crystalline polyamide is a polyamide that has a heat of fusion ("$\Delta H_f$") of at least 5 Joules per gram ("J/g"). In some embodiments, the polyamides (PA) described herein have a $\Delta H_f$ of at least 30 J/g, or at least 35 J/g. Additionally or alternatively, in some embodiments the polyamide (PA) has a $\Delta H_f$ of no more than 60 J/g or no more than 55 J/g. In some embodiments, the polyamide (PA) has a $\Delta H_f$ of from 30 J/g to 60 J/g or from 35 J/g to 60 J/g, from 30 J/g to 55 J/g, or from 35 J/g to 55 J/g. $\Delta H_f$ can be measured according to ASTM D3418 using a heating rate of 20° C./minute.

The polyamide (PA) has a Tg of at least 145° C., preferably at least 150° C. In some embodiments, the polyamide (PA) has a Tg of no more than 190° C., no more than 180° C., or no more than 170° C. In some embodiments, the polyamide (PA) has a Tg of from 145° C. to 190° C., from 145° C. to 180° C., from 145° C. to 170° C., from 150° C. to 190° C., from 150° C. to 180° C., or from 150° C. to 170° C. Tg can be measured according to ASTM D3418.

The polyamide (PA) has a Tm of at least 295° C., preferably at least 300° C. In some embodiments the polyamide (PA) has a Tm of no more than 360° C., no more than 350° C., or no more than 340° C. In some embodiments, the polyamide (PA) has a Tm of from 295° C. to 360° C., from 295° C. to 350° C., from 295° C. to 340° C., 300° C. to 360° C., from 300° C. to 350° C., or from 300° C. to 340° C. Tm can be measured according to ASTM D3418.

The polyamides (PA) of the present invention may have a number average molecular weight ("Mn") ranging from 1,000 g/mol to 40,000 g/mol, for example from 2,000 g/mol to 35,000 g/mol, from 4,000 to 30,000 g/mol, or from 5,000 g/mol to 20,000 g/mol. The number average molecular weight Mn can be determined by gel permeation chromatography (GPC) using ASTM D5296 with polystyrene standards.

The polyamide (PA) described herein can be prepared by any conventional method adapted to the synthesis of polyamides and polyphthalamides. Preferentially, the polyamide (PA) of the invention is prepared by reacting (by heating) the monomers in presence of less than 60 wt. % of water, preferentially less than 50 wt. %, up to a temperature of at least Tm+10° C., Tm being the melting temperature of the polyamide (PA), where wt. % is relative to the total weight of the reaction mixture.

The polyamide (PA) described herein can for example be prepared by thermal polycondensation (also referred to as polycondensation or condensation) of aqueous solution of monomers and comonomers. In one embodiment, the polyamide (PA) is formed by reacting, in the reaction mixture, at least the $C_4$ to $C_{12}$ aliphatic diamine, the bis(aminoalkyl)cyclohexane, the terephthalic acid, and the cyclohexanedicarboxylic acid. In some embodiments, the total number of moles of diamines in the reaction mixture is substantially equimolar to the total number of moles of dicarboxylic acids in the reaction mixture. As used herein, substantial equimolar denotes a value that is ±15% of the indicated number of moles. For example, in the context of the diamine and dicarboxylic acid concentrations in the reaction mixture, total number of moles of diamines in the reaction mixture is ±15% of the total number of moles of dicarboxylic acids in the reaction mixture. The reaction mixture may contain a chain limiter, which is a monofunctional molecule capable of reacting with the amine or carboxylic acid moiety, and is used to control the molecular weight of the polyamide (PA). For example, the chain limiter can be acetic acid, propionic acid, benzoic acid and/or benzylamine. A catalyst can also be used. Examples of catalyst are phosphorous acid, orthophosphoric acid, meta-phosphoric acid, alkali-metal hypophosphite such as sodium hypophosphite and phenylphosphinic acid. A stabilizer, such as a phosphite, may also be used.

Polymer Composition (C)

The polymer composition (C) comprises the polyamide (PA) of the present invention, above described.

The polyamide (PA) may be present in the composition (C) in a total amount of greater than 30 wt. %, greater than 35 wt. % by weight, greater than 40 wt. % or greater than 45 wt. %, based on the total weight of the polymer composition (C).

The polyamide (PA) may be present in the composition (C) in a total amount of less than 99.95 wt. %, less than 99 wt. %, less than 95 wt. %, less than 90 wt. %, less than 80 wt. %, less than 70 wt. % or less than 60 wt. %, based on the total weight of the polymer composition (C).

The polyamide (PA) may for example be present in the composition (C) in an amount ranging between 35 and 70 wt. %, for example between 40 and 55 wt. %, based on the total weight of the polymer composition (C).

The composition (C) may also comprise one component selected from the group consisting of reinforcing agents, tougheners, plasticizers, colorants, pigments, antistatic agents, dyes, lubricants, thermal stabilizers, light stabilizers, flame retardants, nucleating agents, antioxidants and other processing aids.

A large selection of reinforcing agents, also called reinforcing fibers or fillers, may be added to the composition according to the present invention. They can be selected from fibrous and particulate reinforcing agents. A fibrous reinforcing filler is considered herein to be a material having length, width and thickness, wherein the average length is significantly larger than both the width and thickness. Generally, such a material has an aspect ratio, defined as the average ratio between the length and the largest of the width and thickness of at least 5, at least 10, at least 20 or at least 50. In some embodiments, the reinforcing fibers (e.g. glass fibers or carbon fibers) have an average length of from 3 mm to 50 mm. In some such embodiments, the reinforcing fibers have an average length of from 3 mm to 10 mm, from 3 mm to 8 mm, from 3 mm to 6 mm, or from 3 mm to 5 mm. In alternative embodiments, the reinforcing fibers have an average length of from 10 mm to 50 mm, from 10 mm to 45 mm, from 10 mm to 35 mm, from 10 mm to 30 mm, from 10 mm to 25 mm or from 15 mm to 25 mm. The average length of the reinforcing fibers can be taken as the average length of the reinforcing fibers prior to incorporation into the polymer composition (C) or can be taken as the average length of the reinforcing fiber in the polymer composition (C).

The reinforcing filler may be selected from mineral fillers (such as talc, mica, kaolin, calcium carbonate, calcium silicate, magnesium carbonate), glass fibers, carbon fibers, synthetic polymeric fibers, aramid fibers, aluminum fibers, titanium fibers, magnesium fibers, boron carbide fibers, rock wool fibers, steel fibers and wollastonite.

Among fibrous fillers, glass fibers are preferred; they include chopped strand A-, E-, C-, D-, S- and R-glass fibers, as described in chapter 5.2.3, p. 43-48 of Additives for Plastics Handbook, 2nd edition, John Murphy. Preferably, the filler is chosen from fibrous fillers. It is more preferably a reinforcing fiber that is able to withstand the high temperature applications.

The reinforcing agents may be present in the composition (C) in a total amount of greater than 15 wt. %, greater than 20 wt. % by weight, greater than 25 wt. % or greater than 30 wt. %, based on the total weight of the polymer composition (C). The reinforcing agents may be present in the composition (C) in a total amount of less than 65 wt. %, less than 60 wt. %, less than 55 wt. % or less than 50 wt. %, based on the total weight of the polymer composition (C).

The reinforcing filler may for example be present in the composition (C) in an amount ranging between 20 and 60 wt. %, for example between 30 and 50 wt. %, based on the total weight of the polymer composition (C).

The composition (C) of the present invention may also comprise a toughener. A toughener is generally a low Tg, with a Tg for example below room temperature, below 0° C. or even below −25° C. As a result of its low Tg, the tougheners are typically elastomeric at room temperature. Tougheners can be functionalized polymer backbones.

The polymer backbone of the toughener can be selected from elastomeric backbones comprising polyethylenes and copolymers thereof, e.g. ethylene-butene; ethylene-octene; polypropylenes and copolymers thereof, polybutenes; polyisoprenes; ethylene-propylene-rubbers (EPR); ethylene-propylene-diene monomer rubbers (EPDM); ethylene-acrylate rubbers; butadiene-acrylonitrile rubbers, ethylene-acrylic acid (EAA), ethylene-vinylacetate (EVA); acrylonitrile-butadiene-styrene rubbers (ABS), block copolymers styrene ethylene butadiene styrene (SEBS); block copolymers styrene butadiene styrene (SBS); core-shell elastomers of methacrylate-butadiene-styrene (MBS) type, or mixture of one or more of the above.

When the toughener is functionalized, the functionalization of the backbone can result from the copolymerization of monomers which include the functionalization or from the grafting of the polymer backbone with a further component.

Specific examples of functionalized tougheners are notably terpolymers of ethylene, acrylic ester and glycidyl methacrylate, copolymers of ethylene and butyl ester acrylate; copolymers of ethylene, butyl ester acrylate and glycidyl methacrylate; ethylene-maleic anhydride copolymers; EPR grafted with maleic anhydride; styrene copolymers grafted with maleic anhydride; SEBS copolymers grafted with maleic anhydride; styrene-acrylonitrile copolymers grafted with maleic anhydride; ABS copolymers grafted with maleic anhydride.

The toughener may be present in the composition (C) in a total amount of greater than 1 wt. %, greater than 2 wt. % or greater than 3 wt. %, based on the total weight of the composition (C). The toughener may be present in the composition (C) in a total amount of less than 30 wt. %, less than 20 wt. %, less than 15 wt. % or less than 10 wt. %, based on the total weight of the polymer composition (C).

The polymer composition (C) may also comprise other conventional additives commonly used in the art, including plasticizers, colorants, pigments (e.g. black pigments such as carbon black and nigrosine), antistatic agents, dyes, lubricants (e.g. linear low density polyethylene, calcium or magnesium stearate or sodium montanate), thermal stabilizers, light stabilizers, flame retardants, nucleating agents and antioxidants.

The polymer composition (C) may also comprise one or more other polymers, preferably polyamides different from the polyamide (PA) of the present invention. Mention can be made notably of semi-crystalline or amorphous polyamides, such as aliphatic polyamides, semi-aromatic polyamides, and more generally the polyamides obtained by polycondensation between an aromatic or aliphatic saturated diacid and an aliphatic saturated or aromatic primary diamine, a lactam, an amino-acid or a mixture of these different monomers.

Preparation of the Polymer Composition (C)

The invention further pertains to a method of making the composition (C) as above detailed, said method comprising melt-blending the polyamide (PA) and the specific components, e.g. a filler, a toughener, a stabilizer, and of any other optional additives.

Any melt-blending method may be used for mixing polymeric ingredients and non-polymeric ingredients in the context of the present invention. For example, polymeric ingredients and non-polymeric ingredients may be fed into a melt mixer, such as single screw extruder or twin screw extruder, agitator, single screw or twin screw kneader, or Banbury mixer, and the addition step may be addition of all ingredients at once or gradual addition in batches. When the polymeric ingredient and non-polymeric ingredient are gradually added in batches, a part of the polymeric ingredients and/or non-polymeric ingredients is first added, and then is melt-mixed with the remaining polymeric ingredients and non-polymeric ingredients that are subsequently added, until an adequately mixed composition is obtained. If a reinforcing agent presents a long physical shape (for example, long fibers as well as continuous fibers), drawing extrusion or pultrusion may be used to prepare a reinforced composition.

Articles and Applications

The present invention also relates to articles comprising the polyamide (PA) of the present invention and to articles comprising the copolymer composition (C) described above.

The article can notably be used in mobile electronics, LED packaging, oil and gas components, food contact components (including, but not limited to, food film and casing), electrical and electronic components (including, but not limited to, power unit components for computing, data-system and office equipment and surface mounted technology compatible connectors and contacts), medical device components, construction components (including, but not limited to, pipes, connectors, manifolds and valves, for cooling and heating systems; boiler and meter components; gas systems pipes and fittings; and electrical protection devices for mini-circuit breakers, contactors, switches and sockets), industrial components, plumbing components (including, but not limited to, pipes, valves, fittings, manifolds, shower taps and shower valves), automotive components, and aerospace components (including, but not limited to, interior cabin components).

The article can, for example, be a mobile electronic device component. As used herein, a "mobile electronic device" refers to an electronic device that is intended to be conveniently transported and used in various locations. A mobile electronic device can include, but is not limited to, a mobile phone, a personal digital assistant ("PDA"), a laptop computer, a tablet computer, a wearable computing device (e.g., a smart watch, smart glasses and the like), a camera, a portable audio player, a portable radio, global position system receivers, and portable game consoles.

The mobile electronic device component may, for example, comprise a radio antenna and the composition (C). In this case, the radio antenna can be a WiFi antenna or an RFID antenna. The mobile electronic device component may also be an antenna housing. Further examples of mobile electronic device components include, but are not limited to, microspeakers, microswitches, microreceivers, connectors, cameras modules, back housings, battery covers, chassis and frames.

In some embodiments, the mobile electronic device component is an antenna housing. In some such embodiments, at least a portion of the radio antenna is disposed on the polymer composition (C). Additionally or alternatively, at least a portion of the radio antenna can be displaced away (e.g. not contacting) from the polymer composition (C). In some embodiments, the device component can be of a mounting component with mounting holes or other fastening device, including but not limited to, a snap fit connector between itself and another component of the mobile electronic device, including but not limited to, a circuit board, a microphone, a speaker, a display, a battery, a cover, a housing, an electrical or electronic connector, a hinge, a radio antenna, a switch, or a switchpad. In some embodiments, the mobile electronic device can be at least a portion of an input device.

Examples of oil and gas components include, but are not limited to, compressor rings, poppets, back-up seal rings, electrical connectors, labyrinth seals, motor end plates, bearings, bushings, suck rod guides and down hole tubing.

Examples of automotive components include, but are not limited to, components in thermal management systems (including, but not limited to, thermostat housings, water inlet/outlet valves, water pumps, water pump impellers, and heater cores and end caps), air management system components (including, but not limited to, turbocharger actuators, turbocharger by-pass valves, turbocharger hoses, EGR valves, CAC housings, exhaust gas recirculation systems, electronic controlled throttle valves, and hot air ducts), transmission components and launch device components (including, but not limited to, dual clutch transmissions, automated manual transmissions, continuously variable transmissions, automatic transmissions, torque convertors, dual mass flywheels, power takeoffs, clutch cylinders, seal rings, thrust washers, thrust bearings, needle bearings, and check balls), automotive electronic components, automotive lighting components (including, but not limited to, motor end caps, sensors, ECU housings, bobbins and solenoids, connectors, circuit protection/relays, actuator housings, Li-Ion battery systems, and fuse boxes), traction motor and power electronic components (including, but not limited to, battery packs), fuel and selective catalytic reduction ("SCR") systems (including, but not limited to, SCR module housings and connectors, SCR module housings and connectors, fuel flanges, rollover valves, quick connects, filter housings, fuel rails, fuel delivery modules, fuel hoses, fuel pumps, fuel injector o-rings, and fuel hoses), fluid system components (e.g. fuels system components) (including, but not limited to inlet and outlet valves and fluid pump components), interior components (e.g. dashboard components, display components, and seating components), and structural and lightweighting components (e.g. gears and bearings, sunroofs, brackets and mounts, electrical battery housings, thermal management components, braking system elements, and pump and EGR systems).

The polyamide (PA), polymer composition (C) and article prepared therefrom may also be used as a gas barrier material for packaging applications, in mono or multilayer articles.

The polyamide (PA), polymer composition (C) and article prepared therefrom can also be used in automotive applications, for example in air induction systems, cooling and heating systems, drivetrain and fuel systems, beams and structural supports, pans and covers.

The article can be molded from the polyamide (PA) or polymer composition (C) of the present invention, by any process adapted to thermoplastics, e.g. extrusion, injection molding, blow molding, rotomolding or compression molding. Polyamide (PA) and polymer composition (C) may also be used in overmolding pre-formed shapes to build hybrid structures.

The article can be printed from the polyamide (PA) or polymer composition (C) of the present invention, by a process comprising a step of extrusion of the material, which is for example in the form of a filament, or comprising a step of laser sintering of the material, which is in this case in the form of a powder.

The present invention also relates to a method for manufacturing a three-dimensional (3D) object with an additive manufacturing system, comprising:
 providing a part material comprising the polyamide (PA) or polymer composition (C) of the present invention, and
 printing layers of the three-dimensional object from the part material.

The polyamide (PA) or polymer composition (C) can therefore be in the form of a thread or a filament to be used in a process of 3D printing, e.g. Fused Filament Fabrication, also known as Fused Deposition Modelling (FDM).

The polyamide (PA) or polymer composition (C) can also be in the form of a powder, for example a substantially spherical powder, to be used in a process of 3D printing, e.g. Selective Laser Sintering (SLS).

Use of the Polyamides (PA), Composition (C) and Articles

The present invention relates to the use of the above-described polyamides (PA), composition (C) or articles for manufacturing a mobile electronic device component, as described above.

The present invention also relates to the use of the above-described polyamides (PA) or composition (C) for 3D printing an object.

Should the disclosure of any patents, patent applications, and publications which are incorporated herein by reference conflict with the description of the present application to the extent that it may render a term unclear, the present description shall take precedence.

EXAMPLES

The present examples demonstrate the synthesis and thermal performance of the polyamides.

The raw materials used to form the samples are listed below:
Hexamethylenediamine (70 wt %, from Ascend Performance Materials)
1,3-bis(aminomethyl)cyclohexane (from Mitsubishi Gas Chemical Company)
Terephthalic Acid (from Flint Hills Resources)
1,4-Cyclohexanedicarboxylic Acid (from Eastman Chemical Company)
Isophthalic acid (from Flint Hills Resources)
Adipic Acid (from Invista)
2,6-Naphthtalenedicarboxylic Acid (from Indorama)
Bibenzoic Acid (from Sigma Aldrich)
5-Hydroxyisophthalic acid (from Sigma Aldrich)
Acetic Acid (from Sigma Aldrich)
Phosphorus Acid (from Sigma Aldrich)

Synthesis of Polyamides

This example demonstrates the synthesis of the polyamides.

All of the polyamides were prepared according to a similar process in an autoclave reactor equipped with a distillate line fitted with a pressure control valve. As an example, in the preparation of polyamide E1, the reactor was charged with 179.3 g of 70% hexamethylenediamine, 102.4 g of 1,3-bis(aminomethyl)cyclohexane, 266.4 g of terephthalic acid, 30.7 g of 1,4-cyclohexanedicarboxylic acid, 206 g of deionized water, 2.2 g of glacial acetic acid and 0.2 g of phosphorus acid. The reactor was sealed, purged with nitrogen and heated to 260° C. The steam generated was slowly released to keep the internal pressure at 120 psig. The temperature was increased to 320° C. The reaction mixture was kept at 320° C. and the reactor pressure was reduced to atmospheric. After holding for an additional 20 min, the polymer was discharged from the reactor.

The following process was used to prepare larger quantities of polyamides (as an example, here is the preparation of polyamide CE9): A stirred batch vessel was charged with 12.25 kg deionized water, a diamine component consisting of 28.7 kg of 70% hexamethylenediamine and a dicarboxylic acid component consisting of 19.3 kg of terephthalic acid and 8.3 kg of isophthalic acid. The reactor was also charged with 13.1 g phosphorus acid and 252 g of glacial acetic acid. A salt solution was obtained by heating the above described mixture at 150° C. The contents were pumped continuously to a reactor zone maintained at about 180 psig and 220° C., then to a high pressure zone maintained at 300° C. and then through a tubular reactor at 100 psig heated to 350° C. The melt was fed into a twin-screw extruder equipped with a forward vacuum vent. The finished polymer was extruded through a strand die into a water bath and chopped into pellets.

Sample parameters are shown in Table 1. In Table 1, HMDA refers to hexamethylenediamine, TA refers to terephthalic acid, IA refers to isophthalic acid, AA refers to adipic acid, NDA refers to 2,6-napthalenedicarboxylic acid, BBA refers to 4,4'-biphenyldicarboxylic Acid, and HIA refers to 5-hydroxyisophthalic acid.

TABLE 1

| | Monomers | | | | | | | | |
| | Diamine (mol %) | | Dicarboxylic Acid (mol %) | | | | | | |
| Sample No. | HMDA | 1,3-BAC | TA | CHDA | IA | AA | NDA | BBA | HIA |
| CE1 | 25 | 75 | 25 | 75 | | | | | |
| CE2 | 50 | 50 | 25 | 75 | | | | | |
| E1 | 60 | 40 | 90 | 10 | | | | | |
| E2 | 60 | 40 | 80 | 20 | | | | | |
| CE3 | 60 | 40 | 90 | | | | 10 | | |
| CE4 | 60 | 40 | 90 | | | | | 10 | |
| E3 | 70 | 30 | 97 | 3 | | | | | |
| E4 | 70 | 30 | 93 | 1 | | 6 | | | |
| E5 | 70 | 30 | 90 | 10 | | | | | |
| CE5 | 70 | 30 | 90 | | | | 10 | | |
| CE6 | 70 | 30 | 90 | | | | | | 10 |
| E6 | 70 | 30 | 70 | 30 | | | | | |
| E7 | 70 | 30 | 50 | 50 | | | | | |
| CE7 | 80 | 20 | 5 | 95 | | | | | |
| CE8 | | 100 | 100 | | | | | | |
| CE9 | 100 | | 70 | | 30 | | | | |
| CE10 | 100 | | 50 | | 50 | | | | |
| CE11 | 100 | | 65 | | | 35 | | | |

Thermal Performance

To demonstrate thermal performance, Tm, Tg and $\Delta H_f$ were measured as described above. The results of thermal testing are displayed in Table 2.

TABLE 2

| | Properties | | | |
| Sample No. | Tg (° C.) | Tm (° C.) | $\Delta H_f$ (J/g) | Tc (° C.) |
| CE1 | 187 | 327 | 10 | 183 |
| CE2 | 142 | 302 | 30 | 248 |
| E1 | 166 | 304 | 31 | 225 |
| E2 | 167 | 305 | 33 | 225 |
| CE3 | 167 | 290 | 30 | 208 |
| CE4 | 165 | 272 | 40 | |
| E3 | 162 | 326 | 46 | 279 |
| E4 | 159 | 320 | 43 | 270 |
| E5 | 167 | 320 | 35 | 249 |
| CE5 | 134 | 273 | 33 | 220 |
| CE6 | 177 | 301 | 9 | |
| E6 | 157 | 322 | 38 | 267 |
| E7 | 159 | 313 | 31 | 275 |
| CE7 | 156 | 383 | 45 | >330 |
| CE8 | 145 | 267 | 25 | |
| CE9 | 133 | 319 | 53 | 271 |
| CE10 | 130 | 269 | 24 | 186 |
| CE11 | 105 | 325 | 68 | 287 |

Referring to TABLE 2, the samples incorporating a cycloaliphatic dicarboxylic acid had, as a whole, significantly improved thermal performance relative to samples including an aromatic dicarboxylic acid. In particular, each sample according the invention, E1 to E7, have a Tg of at least 145° C., a Tm of at least 295° C., and a $\Delta H_f$ of at least 30 J/g. On the other hand, each of the comparative examples (CE), except for CE7 have at least one of Tg, Tm and $\Delta H_f$ less than 145° C., 295° C., and 30 J/g, respectively. With respect to CE7, Tm is significantly above 360° C., which cannot be melt processed (e.g. injection molded) without degradation.

Moreover, comparison of E1 with CE3 and CE4 demonstrates that, unexpectedly, the polyamides incorporating 1,4-CHDA had, on the whole, improved thermal performance relative to corresponding polyamides in which the 1,4-CHDA was replaced with an aromatic dicarboxylic acid. For example, E1 (including 1,4-CHDA) had a Tg greater than 145° C., a Tm greater than 295° C., and a $\Delta H_f$ greater than 30 J/g. On the other hand, CE3 (including NDA) and CE4 (including BBA) both had a Tm of less than 295° C. As another example, similarly to E1, E5 (including 1,4-CHDA) had a Tg greater than 145° C., a Tm greater than 295° C., and a $\Delta H_f$ greater than 30 J/g. On the other hand, CE5 (including NDA) had a Tg of less than 145° C. and Tm less than 295° C., and CE6 (including HIA) had a $\Delta H_f$ less than 30 J/g. The examples demonstrate that with the bis(aminoalkyl)cyclohexane, surprisingly, the resulting polyamides had improved thermal performance, as a whole, relative to corresponding polyamides in which the CHDA is replaced with an aromatic dicarboxylic acid.

The embodiments above are intended to be illustrative and not limiting. Additional embodiments are within the inventive concepts. In addition, although the present invention is described with reference to particular embodiments, those skilled in the art will recognized that changes can be made in form and detail without departing from the spirit and scope of the invention. Any incorporation by reference of documents above is limited such that no subject matter is incorporated that is contrary to the explicit disclosure herein.

The invention claimed is:

1. A semi-crystalline polyamide derived from the polycondensation of monomers in a reaction mixture comprising:
   a diamine component comprising:
      50 mol % to 95 mol % of a $C_4$ to $C_{12}$ aliphatic diamine,
      5 mol % to 50 mol % of bis(aminoalkyl)cyclohexane,
      wherein mol % is relative to the total number of moles of all diamines in the diamine component;
   a dicarboxylic acid component comprising:
      45 mol % to 99 mol % of terephthalic acid,
      1 mol % to 55 mol % of cyclohexanedicarboxylic acid,
      wherein mol % is relative to the total number of moles of all dicarboxylic acids in the dicarboxylic acid component;
   wherein the $C_4$ to $C_{12}$ aliphatic diamine is 1,6-diaminohexane.

2. The polyamide of claim 1, wherein the bis(aminoalkyl)cyclohexane is 1,3-bis(aminomethyl)cyclohexane or 1,4-bis(aminomethyl)cyclohexane.

3. The polyamide of claim 2, wherein the cyclohexanedicarboxylic acid is 1,4-cyclohexanedicarboxylic acid.

4. The polyamide of claim 1, wherein the dicarboxylic acid component further comprises an additional dicarboxylic acid selected from the group consisting of $C_4$ to $C_{12}$ aliphatic dicarboxylic acids, aromatic dicarboxylic acids and cycloaliphatic dicarboxylic acids.

5. The polyamide of claim 4, wherein:
   The $C_4$ to $C_{12}$ aliphatic dicarboxylic acid is selected from the group consisting of: succinic acid [HOOC—$(CH_2)_2$—COOH], glutaric acid [HOOC—$(CH_2)_3$—COOH], 2,2-dimethyl-glutaric acid [HOOC—$C(CH_3)_2$—$(CH_2)_2$—COOH], adipic acid [HOOC—$(CH_2)_4$—COOH], 2,4,4-trimethyl-adipic acid [HOOC—$CH(CH_3)$—$CH_2$—$C(CH_3)_2$—$CH_2$—COOH], pimelic acid [HOOC—$(CH_2)_5$—COOH], suberic acid [HOOC—$(CH_2)_6$—COOH], azelaic acid [HOOC—$(CH_2)_7$—COOH], sebacic acid [HOOC—$(CH_2)_8$—COOH], 1,12-dodecanedioic acid [HOOC—$(CH_2)_{10}$—COOH];
   the aromatic dicarboxylic acid is selected from the group consisting of: phthalic acids, including isophthalic acid (IA), naphthalenedicarboxylic acids, 4,4' bibenzoic acid, 2,5-pyridinedicarboxylic acid, 2,4-pyridinedicarboxylic acid, 3,5-pyridinedicarboxylic acid, 2,2-bis(4-carboxyphenyl)propane, 2,2-bis(4-carboxyphenyl)hexafluoropropane, 4,4'-bis(4-carboxyphenyl)sulfone, 2,2-bis(4-carboxyphenyl)ketone, 2,2-bis(3-carboxyphenyl)propane, 2,2-bis(3-carboxyphenyl)hexafluoropropane, 2,2-bis(3-carboxyphenyl)ketone, bis(3-carboxyphenoxy)benzene; and
   the cycloaliphatic dicarboxylic acid is selected from the group consisting of:
   cyclopropane-1,2-dicarboxylic acid, 1-methylcyclopropane-1,2-dicarboxylic acid, cyclobutane-1,2-dicarboxylic acid, tetrahydrofuran-2,5-dicarboxylic acid, 1,3-adamantanedicarboxylic acid.

6. The polyamide of claim 1, comprising a heat of fusion of at least 30 J/g, as measured according to ASTM D3418 using a heating rate of 20° C./minute.

7. The polyamide of claim 1, comprising a glass transition temperature of at least 145° C., as measured according to ASTM D3418.

8. The polyamide of claim 1, comprising a melting temperature of at least 295° C., as measured according to ASTM D3418.

9. The polyamide of claim 1, exhibiting a glass transition temperature Tg of at least 150° C. and a melting temperature Tm of at least 300° C., as measured according to ASTM D3418.

* * * * *